(12) United States Patent
Zhu et al.

(10) Patent No.: US 12,367,240 B1
(45) Date of Patent: Jul. 22, 2025

(54) SYSTEMS AND METHODS FOR MULTIMODAL INDEXING OF VIDEO USING MACHINE LEARNING

(71) Applicant: Amazon Technologies, Inc., Seattle, WA (US)

(72) Inventors: Wentao Zhu, Redmond, WA (US); Mohamed Kamal Omar, Seattle, WA (US); Han-Kai Hsu, Seattle, WA (US); Xiaohang Sun, Bellevue, WA (US); Ashutosh Sanan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 17/852,945

(22) Filed: Jun. 29, 2022

(51) Int. Cl.
*G06F 16/75* (2019.01)
*G06F 16/71* (2019.01)
*G06F 16/783* (2019.01)
*G06N 3/08* (2023.01)

(52) U.S. Cl.
CPC .............. *G06F 16/75* (2019.01); *G06F 16/71* (2019.01); *G06F 16/7834* (2019.01); *G06N 3/08* (2013.01)

(58) Field of Classification Search
CPC ...... G06F 16/75; G06F 16/71; G06F 16/7834; G06N 3/08
See application file for complete search history.

(56) References Cited

PUBLICATIONS

Arsha Nasrani et al., "Attention Bottlenecks for Multimodal Fusion", pub. 2021 (Year: 2021).*

* cited by examiner

*Primary Examiner* — Mekonen T Bekele
(74) *Attorney, Agent, or Firm* — Eversheds Sutherland (US) LLP

(57) ABSTRACT

Systems, methods, and computer-readable media are disclosed for systems and methods multimodal indexing of video using machine learning. An example method may include deceiving, by a video encoder of an audio-video transformer neural network comprising one or more computer processors coupled to memory, a first frame and a second frame associated with a first segment of a video. The example method may also include receiving, by an audio encoder of the audio-video transformer neural network, an audio spectrogram comprising first audio data associated with the first segment of the video. generating, by the video encoder, a first video embedding. The example method may also include generating, by the audio encoder, a first audio embedding. The example method may also include determining a fusion of the first video embedding and the first audio embedding using a multimodal bottleneck token. The example method may also include determining an output including the first video embedding and the first audio embedding. The example method may also include determining a classification of the first portion of the video based on the output.

20 Claims, 11 Drawing Sheets

SYSTEMS AND METHODS FOR MULTIMODAL INDEXING OF VIDEO USING MACHINE LEARNING

BACKGROUND

Computer-based video understanding is beneficial for a variety of use cases, such as cashier-less stores, autonomous robot functionality, video advertisements, verifying compliance of videos with video-hosting platform terms, and providing users with information about the contents of videos, among many other uses cases. One important task associated with computer-based video understanding is action recognition, which involves computer-based identification of certain types of actions within video clips. For example, action recognition may involve identifying if a user within a video clip is drinking, driving a vehicle, etc.

Deep learning-based action recognition methods have been widely explored since the great success of AlexNet on image classification. Conventional deep learning-based action recognition may be mainly divided into two aspects: (1) methods involving the use of deep ConvNets and (2) methods involving the use of deep sequential learning. Deep ConvNets methods primarily involve integrated various factorization techniques or a priori for efficient video understanding. Some works focus on extracting effective spatio-temporal features or capturing complicated long-range dependencies. Deep sequential learning methods attempt to formulate spatial and temporal relationships through advanced deep sequential models or attention mechanisms.

Some attempts at action recognition in videos have been made using transformers. A transformer is a type of neural network that is often used for processing sequential data, such as natural language text. A transformer learns context and meaning by tracking relationships in the sequential data. The transformer is beneficial over traditional neural networks because input sequences can be processed in parallel using multiple graphics processing units (GPUs), which increases the training and processing speed of the model. However, simply applying a transformer to the three-dimensional (3D) video domain is computationally intensive. Consequentially, most of the efforts focus on designing efficient transformer models to reduce computation and memory consumption. Video vision transformers (ViViT) and TimeS study various factorization methods along spatial and temporal dimensions. Multiscale vision transformers (MViT) conduct a trade-off between resolution and the number of channels and construct a multi-scale transformer to learn a hierarchy from simple dense resolution and fine-grained features to complex coarse features. Multiview transformers further employ multiple branches to efficiently learn from various granularities of video views. Video-audio-text transformers (VATT) conduct unsupervised multi-modality self-supervised learning with a pure-transformer structure. Multimodal bottleneck transformers (MBT) construct multimodal bottleneck tokens to learn multimodal features alternatively from an image transformer and an audio transformer.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
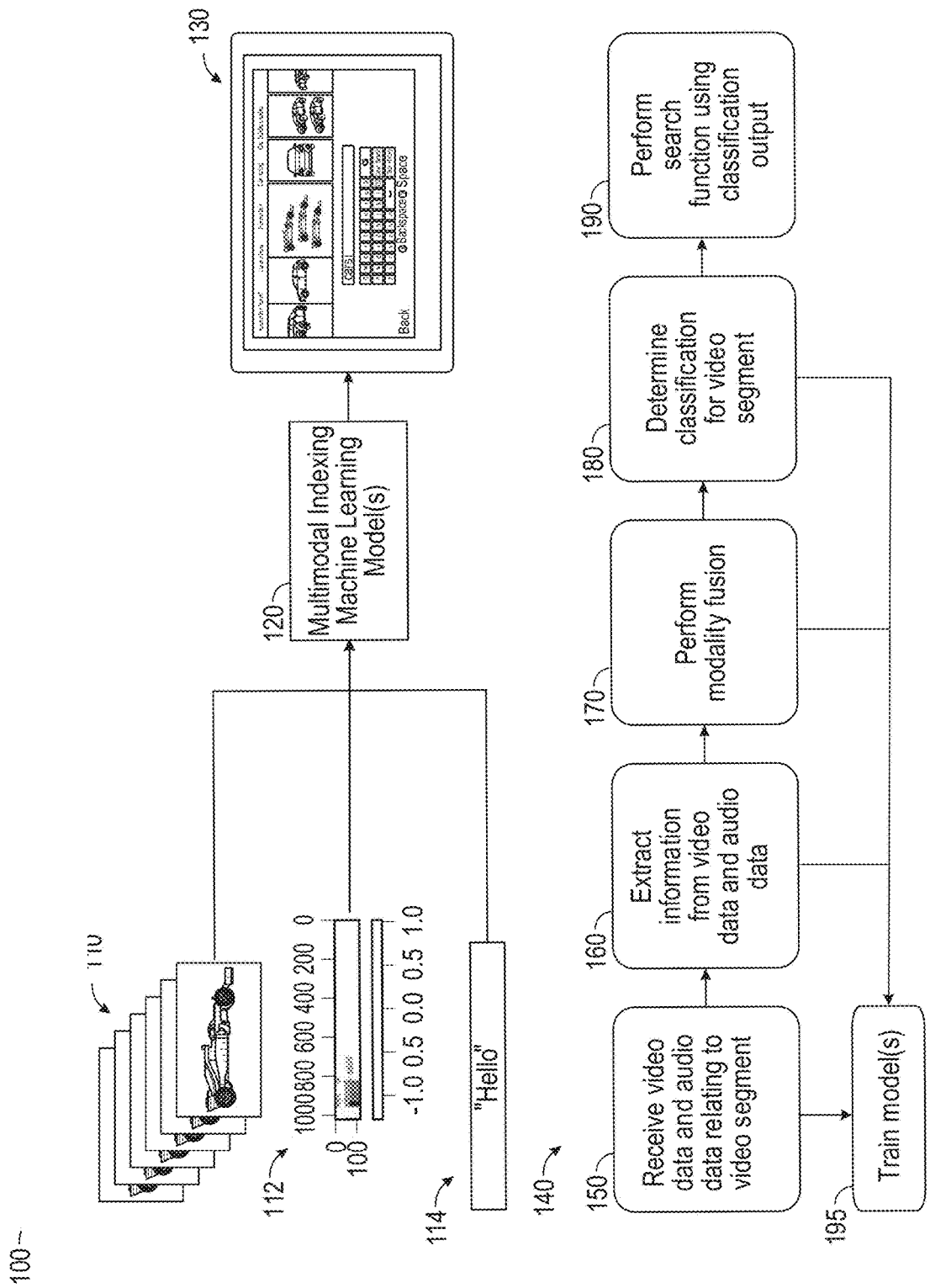
FIG. 1 is a schematic illustration of an example use case for multimodal indexing of video using machine learning in accordance with one or more example embodiments of the disclosure.

This disclosure relates to, among other things, devices, systems, methods, computer-readable media, techniques, and methodologies for multimodal indexing of video using machine learning. In certain example embodiments described herein, the multimodal indexing of video may be applied to a multimedia platform. A multimedia platform may be a system that may host different types of multimedia content, such as movies and television shows, music, and/or any other types of content. The multimedia platform may allow users to access and view this content, oftentimes from user devices such as smartphones, desktop and laptop computers, smart televisions, and/or any other type of device. However, the multimodal indexing of video may also be applied in any other context as well, and the example of a multimedia platform is not intended to be limiting.

Videos (for example, television shows and movies, among other types of video content) may be one of the core assets on a multimedia platform. Therefore, it is important for the platform to understand the content of any video in order to inform any users of such content. This may allow the users to make informed decisions about what specific videos they desire to view without having to play the video to preview the content. This may also allow for the removal of any content that violates quality standards and/or any other standards associated with the platform. Such information may also be used for any other number of purposes as well, such as categorizing videos, providing more effective video searching functionality to users, etc. To this end, the multimodal video indexing system may employ a machine learning model (although reference is made to a machine learning model, any other type of model may also be applicable) that is trained to more effectively classify videos or segments of videos based on their contents.

Particularly, the machine learning model includes a multimodal transformer that may receive multiple different types of data as inputs to more effectively perform computer-based video understanding (rather than simply relying on the data associated with the video frames themselves. In one or more embodiments, the multimodal transformer may be in the form of an audio-video transformer (AVT), which may be a type of neural network. This is in contrast to other types of existing transformers, which may use image and audio data. These existing transformers may not be as effective as the AVT because, among other reasons described herein, such prior transformer models rely on image transformers and may not be able to capture the fundamental temporal data that may be otherwise gleaned from video. The AVT may receive video frames corresponding to a segment of a video (or a full video) and an audio spectrogram associated with audio corresponding to the segment of the video. Using these inputs, the AVT may be trained to perform action recognition (or any other task associated with computer-based video understanding). The AVT may also leverage a multimodal bottleneck transformer, which may be used for the fusion of the video and audio data for more effective video understanding. Although reference is made herein to an AVT involving the use of video and audio as inputs, any other combinations of different types of data may also be used as well (for example, any combination of audio, video, image, text, etc.). In this manner, the AVT may also be generally referred to as a "multimodal transformer." Additional details about the structure of the multimodal transformer may be provided at least with respect to FIGS. 3A-3B, which are described below.

The multimodal transformer may also employ a unique hybrid loss objective that may involve a combination of one or more different types of loss functions. These loss functions may be used to train the model to more effectively process any data that is received. In one or more embodiments, four loss functions may be employed, which may include at least a modality alignment loss function, a video classification loss function, an audio-video match cross-entropy loss function (if audio and video are used as the multiple modalities), and a multimodal classification loss function. However, any other number of loss functions may also be employed as well. These loss functions are also described in additional detail with respect to at least FIGS. 3A-3B.

Additionally, to fully explore the structural information in the audio spectrogram, a unique masked audio model may be employed. Masking may refer to removing or otherwise hiding certain portions of audio data such that they may not be ascertainable. The model may then be provided with the audio data including the masked portions and may be tasked with determining the original audio data that was included in the masked areas. This may allow the model to be trained based on any distinctions between the determined model output and the known audio data that was included in the masked portions. Traditional audio masking may involve masking random portions of audio data. In contrast with these traditional methods that involve simple, random masking, the systems described herein involve a more focused masking method that, at a high level, selects portions of the audio spectrogram to mask that include actual audio data (for example, a person speaking, a vehicle driving, background noise, etc.). This prevents the scenario that may arise in traditional audio masking where a portion of the audio data that does not include is masked. Additional details about this audio masking method are provided with respect to FIGS. 4B-4F.

The output of the AVT may be one or more classifications associated with the segment of video that was provided as an input to the AVT. In some cases, classifications may be provided on a more granular level, such as on a frame-by-frame level as well (for example, each frame may be associated with one or more classifications). Each of the modalities that were provided as inputs (for example, video data, audio data, and/or any other types of data) may have their own associated classification outputs, which may be provided in the form of classification tokens. The combination of these classification outputs provided for the different modalities may be used to determine the overall classification for the video segment (or whole video).

Once the output of the AVT is obtained, the output may be used for any number of different purposes. For example, the video classification may allow for more effective video indexing, video searching, video retrieval, action localization, action clustering, video clustering, and/or any other purpose. For example, a frame within a video may be classified as depicting a race car. Based on this classification, a search function of the multimedia platform may be improved such that the multimedia platform may be able to make more effective video recommendations when a user inputs a search for "car," or similar subject matter. This is merely one example, and the classification may be used for any other number of purposes.

Referring to FIG. 1, an example use case 100 for multimodal indexing of video using machine learning is depicted in accordance with one or more example embodiments of the disclosure. For example, the use case may illustrate one or more multimodal indexing machine learning model(s) 120 may be stored at a remote server and may be executed to perform video classification and/or any other types of functions described herein. In one or more embodiments, the machine learning model(s) 120 may include a multimodal transformer, such as the AVT described herein.

The multimodal indexing machine learning model(s) 120 may receive as inputs any combination of different data modalities associated with any content included within the multimedia platform. The inputs may include any number of different types of combinations of a video input 110, an audio input 112, and/or a text input 114 (and/or any other types of data). For example, the video input 110 may include a segment of a video included within the multimedia platform (the frames that a user may see while viewing the segment of the video). The audio input 112 may include any audio associated with the particular video segment (the audio that the user may hear while viewing the segment of the video). The text input 114 may include any text associated with the same video segment (any text that may be displayed to the user while viewing the segment of the video, such as captions, for example). The inputs may also include any other type of modality as well. Additionally, while reference is made to a "segment" of video, this may also refer to the video in its entirety as well.

The output of the multimodal indexing machine learning model(s) 120 may be one or more classifications associated with the segment of video that was provided as an input to the multimodal transformer. These outputs may then be used to present information to a user. For example, the information may be presented through a user interface 130. The user interface 130 may be associated with a device that a user is using to access the multimedia platform that is hosting the video content. The outputs may also be used to allow the user to more effectively interact with the multimedia platform (for example, search the platform for specific types of videos, etc.). Other embodiments may have additional, fewer, or different types of outputs and/or information presented. As one non-limiting example, the user interface 130 depicted in the figure shows a search function being performed by a user, where the videos that are recommended through the search function may be based in part on the classifications output by the multimodal indexing machine learning model(s) 120.

To perform multimodal indexing based on the multimodal indexing machine learning model(s) 120, an example process flow 140 is presented and may be performed, for example, by one or more remote servers. The remote server and/or computer system may include at least one memory that stores computer-executable instructions and at least one processor configured to access the at least one memory and execute the computer-executable instructions to perform various actions or operations, such as one or more of the operations in the process flow 140 of FIG. 1. The process flow 140 is merely intended to provide a high-level example of the use of the multimodal indexing machine learning model(s) 120 and is not intended to be limiting in any way.

At a first block 150, video data and audio data associated with a video segment may be received. For example, if a television series about race cars is being analyzed by the multimodal indexing machine learning model(s) 120, then the inputs may include frames associated with a video segment relating to a five second clip of a car driving around a corner on a track. The inputs may also include an audio spectrogram including audio data relating to that same five second segment. However, the relative amount of the overall video that is provided as an input to be classified at any given time may vary. For example, segments of one second, one minute, ten minutes, and/or the entire video may also be provided as inputs. Additionally, while one five second segment is provided for analysis at one time, additional segments comprising the overall video may also be analyzed sequentially or in parallel with the first segment as well. Analyzing certain segments of the entire video may allow for more granular data about the contents of the video to be determined in a more effective manner. For example, it may be determined that one segment includes a race car, and a second segment includes a driver speaking to a camera.

At a second block 160, information may be extracted from the video data and the audio data. For example, at a high level, the AVT may break down the frames of the video input 110 into smaller portions referred to as tokens. Each video token may include a "patch" of pixels from the frame. The AVT may similarly break down any other types of input modalities into smaller components for more effective processing of the data as well. Additional details about the specific operations performed with respect to this information extraction, as well as any other operations described with respect to process flow 140, may be described in association with at least FIGS. 2 and 3A-3B.

At a third block 170, fusion modality may be performed using the video and audio data. Fusion modality may allow the multimodal indexing machine learning model(s) 120 to consider information included in the video data 110, audio data 112, and/or text data 114 (as well as any other types of data) in combination, rather than simply analyzing all of these different modalities separately. This may allow the multimodal indexing machine learning model(s) 120 to perform more effective classification because all the information associated with these different modalities may be considered in conjunction at an early stage in the process.

At a fourth block 180, one or more classifications for the video segment may be determined. For example, the multimodal indexing machine learning models(s) 120 may produce a classification indicating that the video segment relates to "cars," or "racing," or "drama," and/or any other number of different types of classifications and/or combinations of classifications. Generally, a classification may simply refer to information that may be associated with a video segment that may provide context into the contents of the video segment. For example, classifications may also include actions, such as "spirited driving" or "arguing." In some cases, the classifications may be selected from a list of pre-determined types of classifications. These classifications may be automatically generated by the indexing machine learning models(s) 120, accessed from a listing stored in a database, manually provided by a user, and/or may be determined in any other suitable manner. However, the classifications do not necessarily need to be pre-determined and may also be uniquely generated by the multimodal indexing machine learning model(s) as well.

At a fifth block 190, a search function may be performed using the classification output from the multimodal indexing machine learning model(s) 120. For example, a user who desires to view a television series about cars may open a search bar of the multimedia platform and enter a text string "cars." Based on the classification of the video segment made by the multimodal indexing machine learning model(s) 120, the system may have information that the television series includes car races. Given this, the platform may then recommend the television series to the user for viewing. This is just one example of a use case in which the classification may be applied to improve the function of the multimedia platform. For example, the platform may also automatically generate listings of content for the user to scroll through that may be categorized based on genre or any other type of categorization. For example, the race television series may be presented in a category entitled "racing" that may include other similar types of content.

At a sixth block 195, the multimodal indexing machine learning model(s) 120 may be trained based on a number of different types of loss functions. In one or more embodiments, the loss functions may include modality alignment loss function, a video classification loss function, an audio-video match cross entropy loss function (if audio and video are used as the multiple modalities), and a multimodal classification loss function. These loss functions may be employed at various stages throughout the process. For example, the alignment loss function may determine if the video data and the audio data being provided to the multimodal transformer are from the same video segment. The video classification loss function may determine the accuracy of the video classification itself, whereas the multimodal classification loss function may determine if the video and audio classifications being produced are similar or different. The cross entropy loss function may be used to determine the accuracy of the overall classification based on the video classification and the audio classification. All of these loss functions may be employed to train the multimodal indexing machine learning model(s) 120 to more effectively process input data in future iterations.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
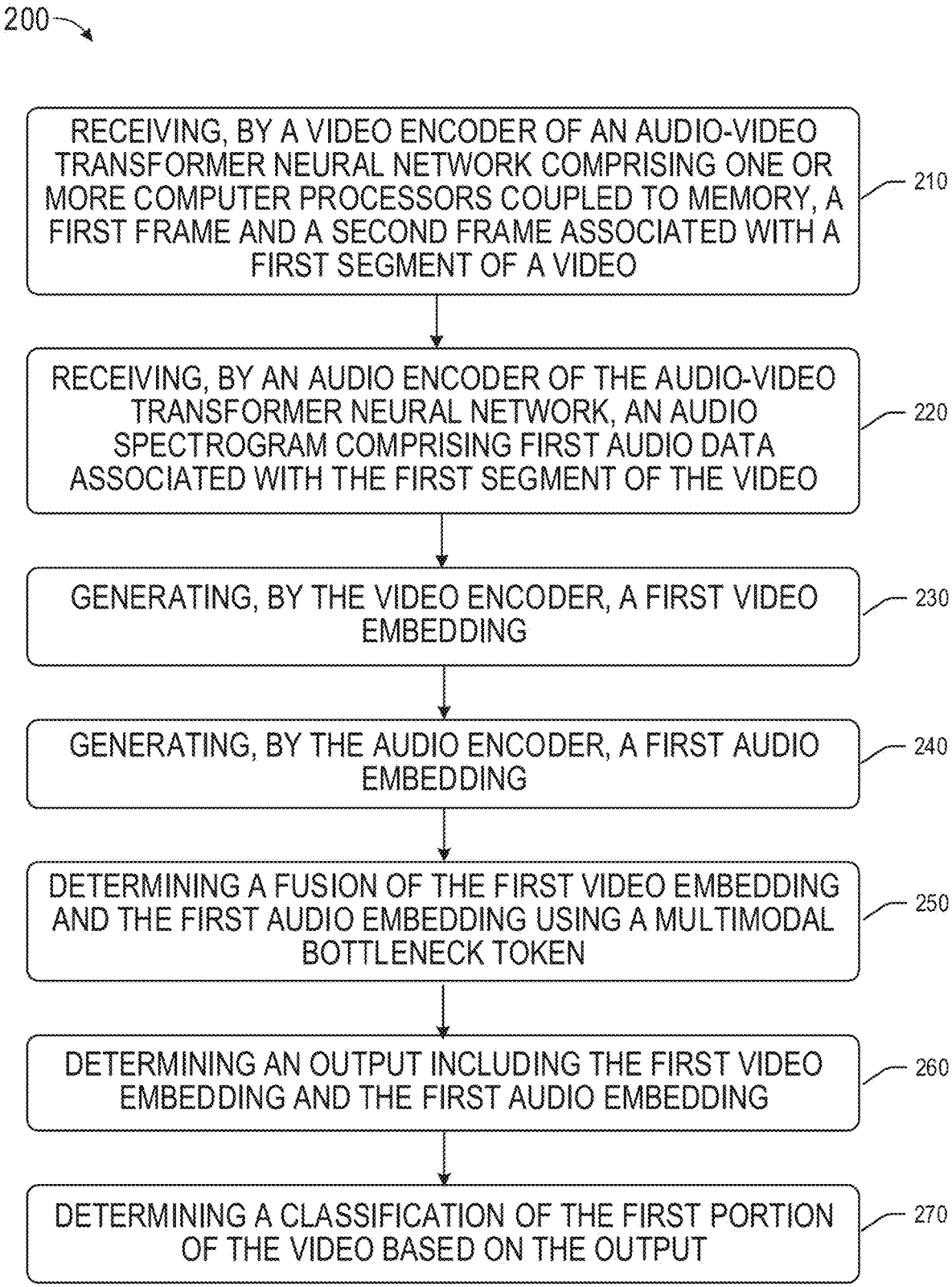
FIG. 2 is a schematic illustration of an example process flow for multimodal indexing of video using machine learning in accordance with one or more example embodiments of the disclosure.

FIG. 2 depicts an example process flow 200 for multi-modal indexing of video using machine learning in accordance with one or more example embodiments of the disclosure. The process flow 200 may provide a more detailed illustration of the processes associated with the AVT than the process flow 140 of FIG. 1. While example embodiments of the disclosure may be described in the context of movies or other video content, it should be appreciated that the disclosure is more broadly applicable to any type of digital content. Some or all the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to receive, by a video encoder of an audio-video transformer neural network comprising one or more computer processors coupled to memory, a first frame and a second frame associated with a first segment of a video. That is, the video encoder may be configured to receive video data that is used by the audio-video transformer to perform classification of a given segment of a video (or an entire video). For example, the video encoder may receive a series of frames corresponding with a scene of a race television series depicting race cars driving a lap around a course.

At block 220 of the process flow 200, computer-executable instructions stored on a memory of a device, such as a remote server or a user device, may be executed to receive, by an audio encoder of the audio-video transformer neural network, an audio spectrogram comprising first audio data associated with the first segment of the video. That is, the audio encoder may be configured to receive audio data that is used by the audio-video transformer to perform classification of the same segment of the video (or an entire video). For example, the audio encoder may receive an audio spectrogram including audio data corresponding with the same scene of the race television series depicting race cars driving the lap around the course. For example, the audio data may include the sounds of the car engines, the cheering of the crowd, the shouting of the pit crews, etc. It should be noted that while the process flow 200 describes a combination of video and audio data as being used to perform the classification of the video segment, any other combination of different types of data may also be used as well.

At block 230 of the process flow 200, computer-executable instructions stored on a memory of a device, such as a remote server or a user device, may be executed to generate, by the video encoder, a first video embedding. The first video embedding may include a first video token and a second video token. The first video token may be a first portion of pixels included in the first frame, and the second video token may include a first classification token. The video encoder may also generate any other number of tokens as well. For example, if a given frame of the video segment includes 200×200 pixels, the video encoder may generate 20 tokens including 10×10 of the pixels. The video encoder may generate tokens in this manner for any of the frames comprising the video segment. This may allow the larger frames to be separated into smaller portions of data for more efficient processing.

The classification token may be an additional token that is generated that is associated with the other tokens including the pixels associated with the frames of the video segment. For example, the CLS token may provide a label associated with a given set of frames comprising a portion of the video, such as "driving car," "drinking alcohol," "arguing," etc.

At block 240 of the process flow 200, computer-executable instructions stored on a memory of a device, such as a remote server or a user device, may be executed to generate, by the audio encoder, a first audio embedding. Similar to the first video embedding, the first audio embedding may include a first audio token and a second audio token. The first audio token may be a first portion of the audio data included in the audio spectrogram, and the second audio token may include a first classification token. The audio encoder may also generate any other number of tokens as well (similar to the video encoder). It should be noted that while reference is made to a "first video embedding" and "first audio embedding," any number of embeddings may be generated.

At block 250 of the process flow 200, computer-executable instructions stored on a memory of a device, such as a remote server or a user device, may be executed to determine a fusion of the first video embedding and the first audio embedding using a multimodal bottleneck token (or multiple multimodal bottleneck tokens). These multimodal bottleneck tokens may be combined with the video tokens through a conventional transformer. In this way, the tokens learn the information from video features, which may share with audio tokens in the next layer. The tokens may also combine with audio tokens, share information with audio tokens, and learn audio-video features through another layer of the transformer. The multiple modality fusion can be stacked any number of additional times as well.

At block 260 of the process flow 200, computer-executable instructions stored on a memory of a device, such as a remote server or a user device, may be executed to determining an output including the first video embedding and the first audio embedding. The output of the AVT may be one or more classifications associated with the segment of video that was provided as an input to the AVT. In some cases, classifications may be provided on a more granular level, such as on a frame-by-frame level as well (for example, each frame may be associated with one or more classifications). Each of the modalities that were provided as inputs (for example, video data, audio data, and/or any other types of data) may have their own associated classification outputs, which may be provided in the form of classification tokens. The combination of these classification outputs provided for the different modalities may be used to determine the overall classification for the video segment (or whole video).

At block 270 of the process flow 200, computer-executable instructions stored on a memory of a device, such as a remote server or a user device, may be executed to determine a classification of the first portion of the video based on the output. The classification may be used for any number of different purposes. For example, the classification may be used for video indexing, video search, video retrieval, action localization, action clustering, video clustering, and/or any other purpose. These uses of the classification may allow a user to have a more beneficial multimedia platform experience. For example, the may allow the users to make informed decisions about what specific videos they desire to view without having to play the video to preview the content. This may also allow a user to more easily find videos including particular types of content to watch. For example, the classification may allow for a user to more effectively search the multimedia platform for movies and TV shows including racing. This may also allow for the removal of any content that violates quality standards and/or any other standards associated with the platform. This may also provide any other number of benefits to the user as well.

Figure 3A:
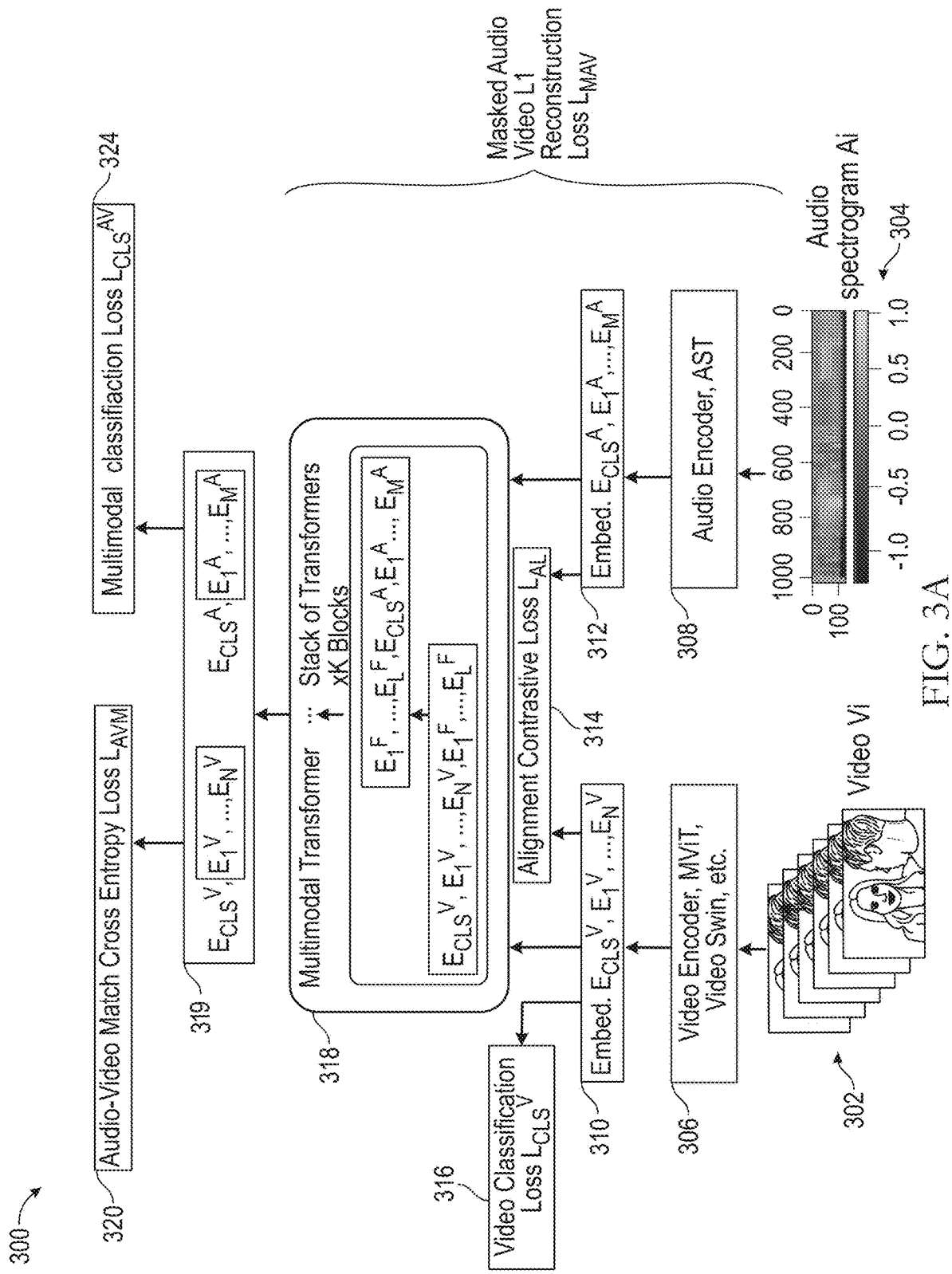
FIGS. 3A-3B are schematic illustrations of an example process flow for multimodal indexing of video using machine learning in accordance with one or more example embodiments of the disclosure.
Figure 3B:
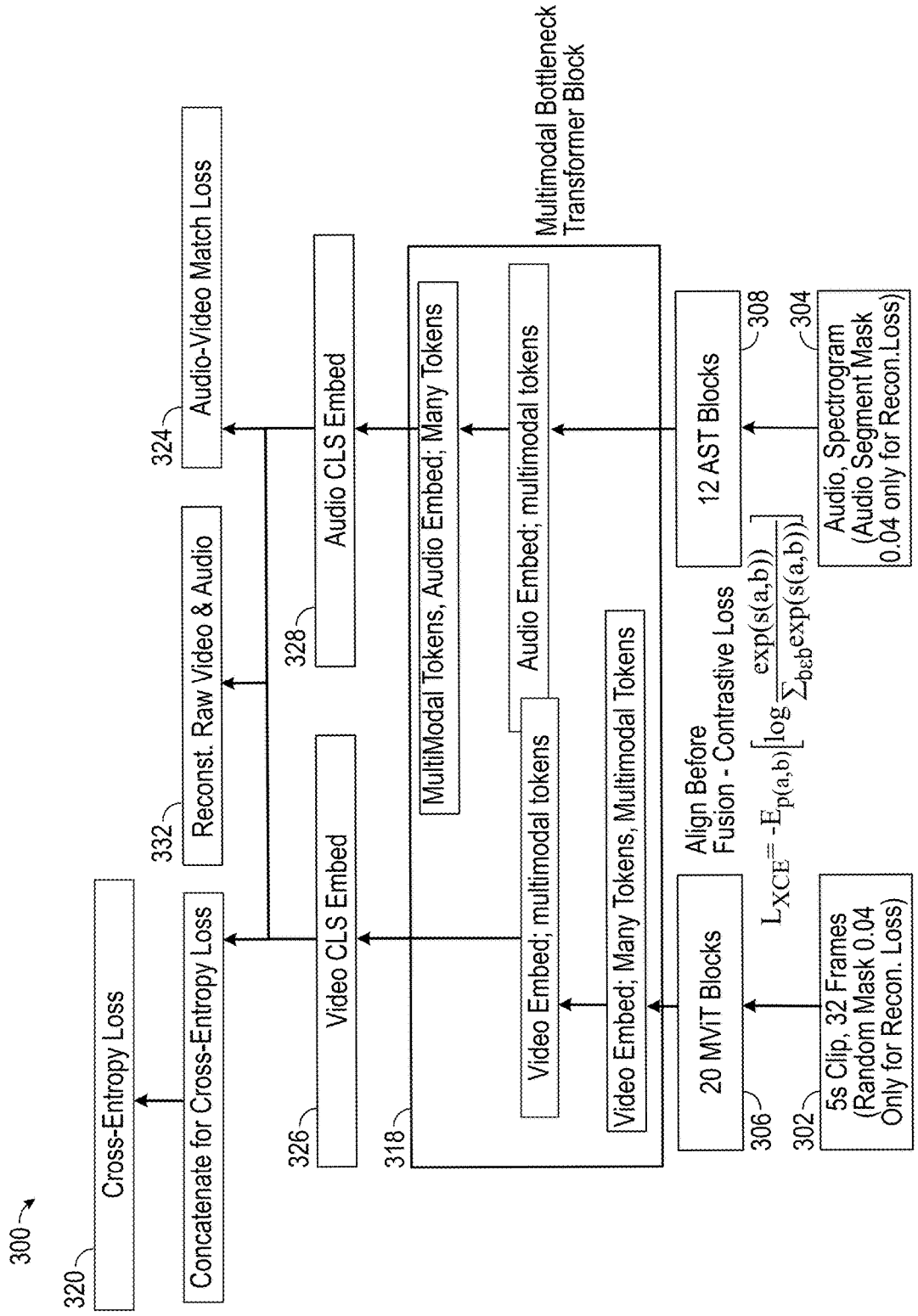

FIGS. 3A-3B depict an example process flow 300 for multimodal indexing of video using machine learning in accordance with one or more example embodiments of the disclosure. The process flow 300 may generally illustrate an example AVT that may be used for computer-based video understanding as described herein. Beginning with FIG. 3A, the process flow 300 may generally involve one or more modality encoders, a multimodal bottleneck transformer 318, and/or one or more loss functions (for example, alignment contrastive loss $L_{AL}$ for modality encoder, audio-video matching loss $L_{AVM}$ M after multimodal fusion, masked audio-video loss $L_{MAV}$, and video classification loss $L_{CLS}^V$ as and multimodal classification loss $L_{CLS}^{AV}$) used to train the AVT.

The process flow 300 may begin with different types of data being received. The data may be any type of data of any modality. FIG. 3A depicts one specific example in which a combination of video data 302 and audio data 304 are used. The video data 302 may represent a segment of a video (or all of the video) for which action recognition (and/or any other video understanding task) is desired to be performed. The audio data 304 may be audio associated with that particular video segment. The video data 302 may be in the form of a sequence of frames, $V_i$. The audio data 304 may be in form of an audio spectrogram, $A_i$. Although the process flow 300 specifically depicts a combination of video data 302 and audio data 304 being received, this is merely for exemplification purposes, and any other combination of different types of data may also be received as well. For example, video data, audio data, and text data may be received, video data and text data may be received, audio data and text data may be received, and/or any other combination of different types of data, including data other than video, audio, and/or text data as well. That is, as aforementioned, any reference to aspects of an AVT may also be generally applicable to a multimodal transformer involving data combinations other than video and audio.

The data may be received by one or more different types of encoders that correspond with the types of data. An encoder may generally refer to a portion of a transformer architecture that may be used to extract features from the data that is received. In this manner, the data may be broken down into feature components that may allow the data to be processed by the transformer. The specific types of encoders that are employed may depend on the types of data being received. For example, at a high level, a video encoder (such as video encoder 306) may break down a frame of a series of frames included in video data 302 into video embeddings. The video embeddings may include one or more different types of tokens, for example. Each video token may include a "patch" of pixels from the frame. For example, if a frame comprises 224×224 pixels, then a collection of 16×16 patches may be extracted as tokens. The number of patches increases as frame resolution increases, which results in greater memory usage. Each token may be associated with a corresponding "positional embedding," which may identify the position of the token in the sequence of tokens. This is one aspect of a transformer model that allows for an improved understanding of relationships in sequential data. Additionally, a classification (CLS) token may be associated with a series of tokens. The CLS token may serve as a classification of that particular series of tokens. For example, the CLS token may provide a label associated with a given set of frames comprising a portion of the video, such as "driving car," "drinking alcohol," "shoot," etc.

Continuing the example presented in FIG. 3A, the video data 302 is received by a video encoder 306 and audio data 304 is received by an audio encoder 308. The video encoder 306, and audio encoder 308 may be used to extract video embeddings, $\{E_{CLS}^V, E_1^V, \ldots, E_N^V\}$, and audio embeddings 312, $\{E_{CLS}^A, E_1^A, \ldots, E_M^A\}$, respectively, where N is the total number of tokens in the final layer of video embeddings, and M is the total number of tokens in the final layer of audio embeddings. In one or more embodiments, an audio spectrogram transformer (AST) may be used as the audio encoder, and a MViT or Video Swin transformer may be used as the video encoder. For the modality encoders, the first 20 layers of MViT may be used to extract the feature for video, and the first 12 layers of AST may be used to extract the feature for audio. However, any other types of audio, video, and/or any other types of modality encoders may also be used as well. The number of layers can also be generalized to other numbers.

Once the video embeddings 310 and audio embeddings 312 are extracted, two different loss functions may be employed (for example, video classification loss function 316 and alignment contrastive loss function 314). These two loss functions may generally be used to train the transformer. For example, as may be the case with any type of loss function, the video classification loss function 316 and alignment contrastive loss function 314 may be used to minimize the amount of error that is produced. In the specific case of the video classification loss function 316 and alignment contrastive loss function 314, the loss functions may be used to determine a difference between the actual outputs being produced by the encoders and the expected outputs.

The video classification loss function 316 may be used to retain the competitiveness of video encoder. Particularly, the video classification loss function 316 may compare a classification produced by the video encoder 306 to a known classification associated with the video data 302 that is received by the video encoder 306. In this manner, the video encoder 306 may be trained to produce more accurate classifications based on any future video data that is received.

The alignment contrastive loss function 314 may be used to train the model to better align the video embeddings produced by the video encoder 306 and the audio embeddings produced by the audio encoder 308. That is, the alignment contrastive loss function 314 may train the model to better ensure that audio segments are processed with respect to their corresponding video segments (this is also applicable to ensure that any other type of data modality aligns with other data of the same segment). Multimodal video inputs, audio and video, may be paired and aligned naturally. Video and audio from the same sample (for example, associated with the same video segment) may be treated as a sample pair. Otherwise, data may be treated as a negative sample pair. Then, contrastive loss and InfoNCE loss may be used to penalize the similarity of negative sample pairs and enlarge the similarity of positive sample pairs. The alignment loss is denoted as L_align or $L_{AL}$. The alignment contrastive loss function 314 may be shown below in Equation 1.

$$L_{AL} = -\mathbb{E}_{(A,V)\in D}\left[y_{AV}\log\frac{\exp\left(\left(g_A(E^A_{CLS})\right)^T g_V(E^V_{CLS})\right)/\tau}{\sum_{(A,V)\in D}\exp\left(\left(g_A(E^A_{CLS})\right)^T g_V(E^V_{CLS})\right)/\tau}\right] \quad \text{(Equation 1)}$$

where D is the multimodal input and may include audio A and video V, $y_{AV}$ is the indicator that the current A and V are from the same sample or not, t is a temperature parameter and set as 0.07 (or any other value), $g_A$ and $g_V$ are linear embedding layers of dimension 256 for audio representation, EA, and video representation, EV, respectively. The dot product $g_A(*)^T g_V(*)$ measures the similarity of audio and video embedding, and the alignment contrastive loss function 314 decreases the divergence of audio and video features for the same sample, which enhances the following cross-modality feature learning.

Following the video classification loss function 316 and the alignment contrastive loss function 314, a multimodal bottleneck transformer 318 may be employed to allow for the fusion of the video and audio data. This may involve generating multimodal bottleneck tokens $\{E_1^F, \ldots, E_L^F\}$ to efficiently learn the cross-modality fusion. The multimodal classification may be achieved by concatenating the CLS embedding followed by a linear layer to yield the classification logits. A common approach for building multimodal models is to simply combine multiple of these modality-specific architectures using late-stage fusion of final representations or predictions. In contrast, the multimodal bottleneck transformer 318 architecture uses "attention bottlenecks" for modality fusion at multiple layers. Compared to traditional pairwise self-attention, these bottlenecks may force information between different modalities to pass through a small number of "bottleneck" latent units, which may require the model to collate and condense the most relevant information in each modality and only share what is necessary.

For the multiple modality fusion, an intermediate structure may be constructed that may include a given number of tokens (for example, four tokens or any other number of tokens). These tokens may then be combined with the video tokens through a conventional transformer. In this way, the tokens learn the information from video features, which may share with audio tokens in the next layer. The tokens may also combine with audio tokens, share information with audio tokens, and learn audio-video features through another layer of the transformer. The multiple modality fusion can be stacked any number of additional times as well.

Prior cross-modality transformers have involved simple concatenations of multimodal embedding, or key exchanges, value matrices between two modalities. Due to the large GPU memory consumption of these existing video transformers, the multimodal bottleneck transformer 318 in the audio-video transformer is used, which handles varied lengths of modality tokens efficiently. The multimodal tokens $\{E_1^F, \ldots, E_L^F\}$ are initialized, where L may be any number. One multimodal bottleneck transformer block may be formulated as:

$$E^{VF} = [E_{CLS}^V, E_1^V, \ldots, E_N^V, E_1^F, \ldots, E_L^F], \tilde{E}^{VF} = MSA(LN(E^{VF})) + E^{VF}$$

$$\hat{E}^{VF} = MLP(LN(E^{VF})) + \tilde{E}^{AF}, E^{AF} = [E_{CLS}^A, E_1^A, \ldots, E_M^A, \hat{E}_1^F, \ldots, \hat{E}_L^F]$$

$$\tilde{E}^{AF} = MSA(LN(E^{AF})) + E^{AF}, \hat{E}^{AF} = MLP(LN(\tilde{E}^{AF})) + \tilde{E}^{AF}$$

where multimodal tokens may be updated by averaging the multimodal tokens along each block. The multimodal bottleneck transformer 318 can be stacked into K blocks. The multimodal bottleneck transformer 318 may reduce the computing complexity from $O((M+N)^2)$ in merged attention to $O((M+L)^2) + O((N+L)^2) \approx O(M^2) + O(N^2)$ since $L << M, N$.

Following the multimodal bottleneck transformer 318, two additional loss functions may be used to further train the AVT. These two loss functions may include a cross entropy loss function 320 and a multimodal classification loss function 324. The cross-entropy loss function 320 may be used to train the classification performed by the audio-video transformer. That is, based on audio and video data that is received, the audio-video transformer may produce one or more classifications for the video segment associated with the video and audio data. For example, the audio-video transformer may indicate that the video includes five frames showing a person drinking alcohol. These types of classifications may be produced for each type of modality and the cross-entropy loss function 320 may be used to determine if the classifications produced by the different modalities match (for example, if any classifications produced with respect to the video data match any classifications produced with respect to the audio data).

The tasks and data may be multi-labeled with missing annotations and masked multilabel loss may be employed using Equation 2:

$$L_{CLS}^V = -\frac{1}{n}\sum_{i=1}^n \frac{1}{|C_i|}\sum_{c\in C_i}\left[c\log p^V(c) + (1-c)\log(1-p^V(c))\right] \quad \text{(Equation 2)}$$

where n is the batch size in the stochastic gradient descent, $C_i$ is the annotated label set for current i-th sample, and $p^V(c)$ is the video classification probability for label c, which is implemented by a linear layer after $E_{CLS}^V$ with a sigmoid activation function.

The audio-video match cross-entropy loss function 320 may be applied to video and audio embeddings after the multimodal bottleneck transformer 318 and may force the multimodal bottleneck transformer 318 to learn high-level semantic labels precisely. The audio-video match cross-entropy loss function 320 may be shown below in Equation 3.

$$L_{AVM} = -\mathbb{E}_{(A,V)\in D}[y_{AV}\log p_{AVM}(y_{AV}) + (1-y_{AV})\log(1-p_{AVM}(y_{AV}))] \quad \text{(Equation 3)}$$

where $y_{AV}$ is the same as the alignment loss, and pAVM (yAV) is implemented by concatenating the video and audio embedding $[E_{CLS}^V, E_{CLS}^A]$ followed by a binary classification to determine the sampled audio-video pair (A, V) are from the same sample or not.

To construct the audio-video loss, any video CLS embeddings and audio CLS embeddings may be concatenated, and a fully connected layer may be used with a binary classification cross entropy loss function. The positive pair can be constructed directly by concatenating the CLS embeddings of the video and the audio from the same sample. The negative pair can be constructed by fixing audio CLS embeddings, and sampling one of the non-same indexed video CLS embeddings for each audio CLS embeddings in one batch of the stochastic gradient descent back propagation training. The negative pair may also be constructed by fixing the video CLS embedding and sampling one of the non-same indexed audio CLS embeddings for each video CLS embeddings in one batch of the stochastic gradient descent back propagation training. The audio-video match loss may be denoted as L_avm.

To constrain non-CLS embeddings, a masked audio-video loss may be used, where the multimodal bottleneck transformer 318 may be forced to learn high-level complete audio activity segments as illustrated in further detail in FIGS. 4A-4F. The audio activity segment may be detected by second-order smooth to remove noise, gradient to detect signal change along the time dimension, absolute gradient to detect changes in both direction, and average the absolute gradient along the feature dimension with smooth to avoid a trivial activity segment. The top significant change points may then be selected as the transition points to segment different audio activities. In the training, we randomly mask a proportion of whole complete audio activity segments.

$$L_{MAV} = \frac{1}{n}\sum_{i=1}^{n} L_1(V_i, \hat{V}_i | \dot{V}_i) + L_1(A_i, \hat{A}_i | \dot{A}_i) \quad \text{(Equation 4)}$$

where $\dot{V}_i$ is the randomly masked video input, $\dot{A}_i$ is the structured (audio complete activity segment) masked audio input, $\hat{V}_i$ and $\hat{A}_i$ are reconstructions from the masked input through the multimodal model, and the decoder can be easily constructed by re-arrange the tokens into two and/or three-dimensional matrix followed by one layer of transposed convolution to match the input dimension.

To construct the masked multimodal model, the same network of multimodal network may be used before the task heads as the encoder. The one dimensional (1D) tokens may be rearranged to 2D for audio and 3D for the video and construct a simple decoder which only includes one layer of 2D convolutional layer for audio reconstruction and 3D convolutional layer for video reconstruction. L1 pixel-wise reconstruction loss may then be used to calculate the masked multimodal model loss.

Similar to the cross-entropy loss function 320, the multimodal classification loss function 324 may involve determining the accuracy of the classifications produced by the transformer. However, the multimodal classification loss function 324 may involve training the transformer with respect to any overall classifications produced by the transformer based on the individual classifications of the different modalities (rather than determining the similarities of the classifications produced by the different modalities). In some cases, this may be achieved by concatenating the video and audio embedding [$E_{CLS}^V, E_{CLS}^A$] (for example, the same as audio-video match loss). A fully connected layer may be constructed to yield the final action classification logits. The multimodal classification loss function 324 may be the same as video classification loss function 316 and is shown below in Equation 5.

$$L_{CLS}^{AV} = -\frac{1}{n}\sum_{i=1}^{n}\frac{1}{|C_i|}\sum_{c \in C_i}\left[c\log p^{AV}(c) + (1-c)\log(1 - p^{AV}(c))\right] \quad \text{(Equation 5)}$$

Any of the classifications produced by the multimodal transformer (and/or any other element of the system described herein) may also be in the form of one or more probabilities of different classifications. For example, a classification may include a probability that a segment of video includes a particular type of classification. Additional probabilities that the segment of video includes other classifications may also be provided as well. Thus, any loss functions that may involve comparisons of classifications produced by the multimodal transformer may refer to comparing these probabilities to known classifications associated with the segments of video.

The combination of the four different loss functions that are employed with respect to the audio-video transformer may result in an overall hybrid loss objective. This hybrid loss objective may consider video classification and various levels of self-supervised loss forces the multimodal transformer to learn effectively from the training data, which greatly alleviates the data hungry pitfall to fit large model capacity in the transformer. The hybrid loss objective may be shown below in Equation 6.

$$L = L_{CLS}^{AV} + L_{CLS}^{V} + \lambda_1 L_{AL} + \lambda_2 L_{AL} + \lambda_3 L_{AL} \quad \text{(Equation 6)}$$

where $\lambda_1$, $\lambda_2$, and $\lambda_3$ are hyper-parameters to balance the loss terms in the training. In some cases, the average of video classification and multimodal classification may achieve the best accuracy on a 28 attributes dataset, however, this is not intended to be limiting.

In terms of video categorization, after training is performed using the AVT, videos may be automatically categorized into different classes. For a new search and retrieval task, which is not falling into the current trained attribute set, the combined CLS embedding from different modalities may be used as the feature of the current video. An independent text embedding may be used to extract the feature from the query. A similarity or metric function can be easily learned. Additionally, video localization tasks may be considered as a frame-wise or shot-wise classification task. The shot can be obtained by pre-processing using the shot boundary detection algorithm. The multimodal transformer may learn features for each frame or shot and conduct classification for each frame or shot. In this way, the multimodal video localization can absorb different aspects, of the video, such as audio, text, and vision, which provides a more comprehensive set of information.

FIG. 3B illustrates additional details pertaining to the process flow 300 of FIG. 3A. For example, FIG. 3B illustrates example outputs of the multimodal transformer (video classification embedding 326 and audio classification embedding 328). FIG. 3B also illustrates that these outputs may be used for various purposes, such as reconstruction of the original raw video and audio at operation 332, the audio-video match loss function 324, and the cross-entropy loss function 320. The figure also shows that the video classification embedding 326 and audio classification embedding 328 may be concatenated to perform the cross-entropy loss. FIG. 3B also illustrates more specific example in which the video encoder 306 is a MVIT and receives a five second video segment comprising 32 frames and the audio encoder 308 is an AST.

Finally, FIG. 3B illustrates the multimodal fusion that may occur within the multimodal bottleneck transformer 318. Any of the additional details provided in FIG. 3B (as well as any details included in FIG. 3A) are merely exemplary and are not intended to be limiting in any way. For the multiple modality fusion, an intermediate structure may be constructed that may include a given number of tokens (for example, four tokens or any other number of tokens). These tokens may then be combined with the video tokens through a conventional transformer. In this way, the tokens learn the information from video features, which may share with audio tokens in the next layer. The tokens may also combine with audio tokens, share information with audio tokens, and learn audio-video features through another layer of transformer. The multiple modality fusion can be stacked any number of additional times as well.

FIGS. 4A-4F schematically illustrate an example audio spectrogram masking process flow in accordance with one or more example embodiments of the disclosure. Different embodiments may include different, additional, or fewer inputs or outputs than those illustrated in the examples of FIGS. 4A-4F.

Figure 4A:
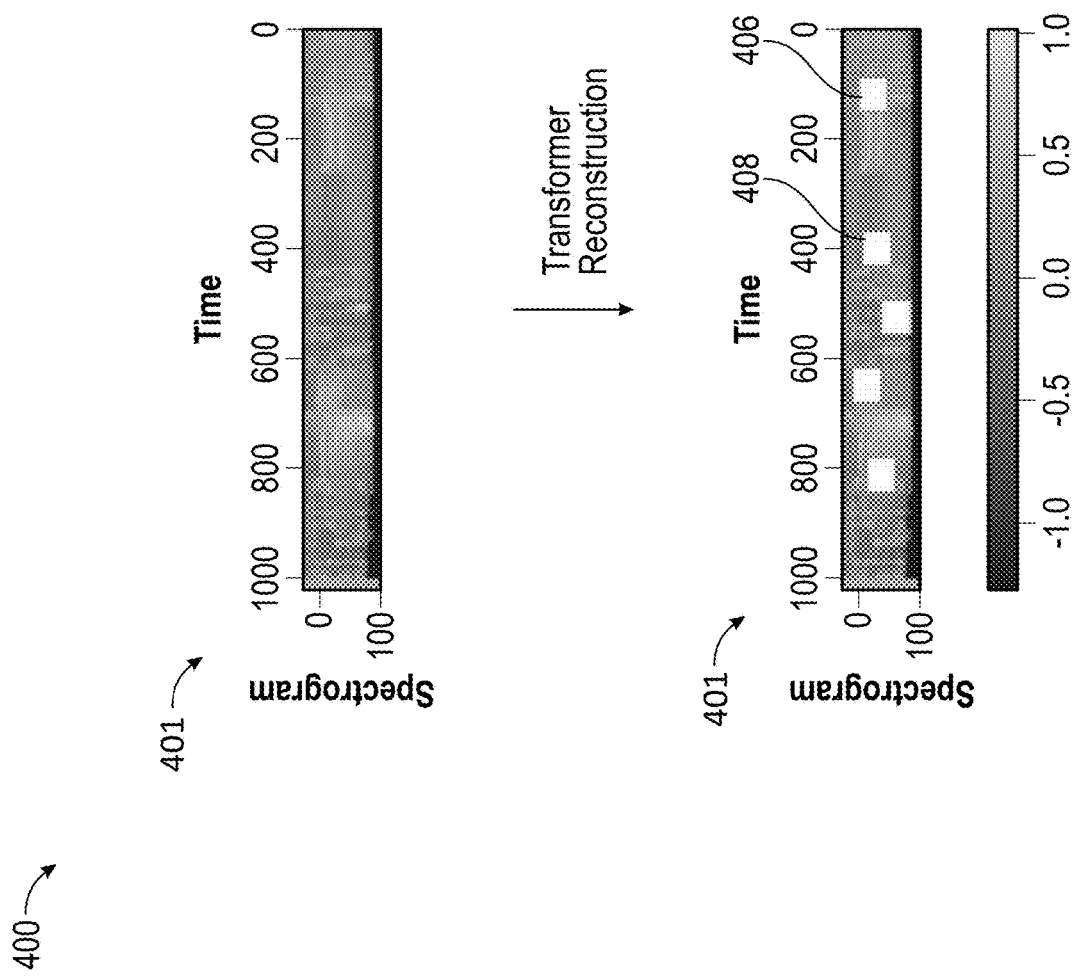
FIGS. 4A-4F schematically illustrate an example audio spectrogram masking process flow in accordance with one or more example embodiments of the disclosure.
Figure 4B:
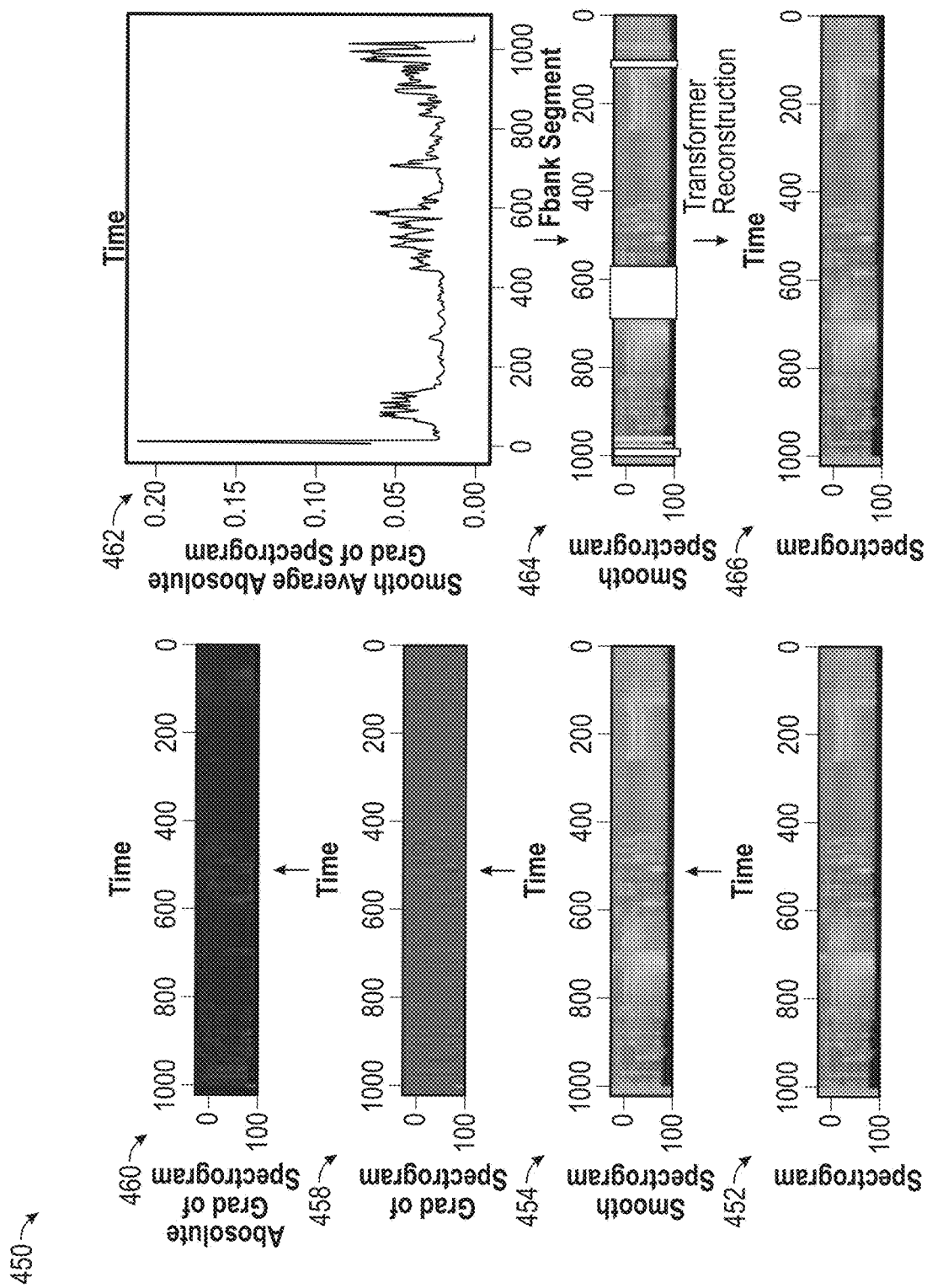

FIGS. 4A-4B illustrate a comparison of a traditional approach to audio masking (FIG. 4A) and the improved approach associated with the multimodal transformer described herein (FIG. 4B). Beginning with FIG. 4A, a process flow 400 for performing audio masking in traditional transformers is illustrated. The process flow 400 may involve performing random masking of audio data in the audio spectrogram 401. In other words, random portions of the audio spectrogram are masked (for example, first portion 406, second portion 408, etc.). This masked spectrogram is then provided to the transformer and the transformer is tasked with attempting to determine the audio data that is associated with the masked portions of the spectrogram. The transformer is then trained based on its performance in determining the audio data that was originally included in the masked portions of the audio spectrogram. For example, if the audio data includes an audio clip of a person speaking the statement "I have a car." If the portion of the spectrogram associated with the person speaking the word "car" is masked, then the accuracy of the transformer in being able to determine that the person speaking the word "car" should be included in the masked portion of the audio data may be determined.

In contrast with the approach illustrated in FIG. 4A, FIG. 4B illustrates a second process flow 450. This process flow 450, instead of masking random segments of the audio spectrogram as is performed in process flow 400, identifies portions of the audio spectrogram 401 that include actual audio (for example, portions of the spectrogram where a person is speaking in the video segment, etc.) to mask. This prevents a scenario that may occur in the process flow 400 where a randomly masked portion of the audio spectrogram includes no audio being produced (for example, no person is speaking in the audio clip at that portion, etc.).

Figure 4C:
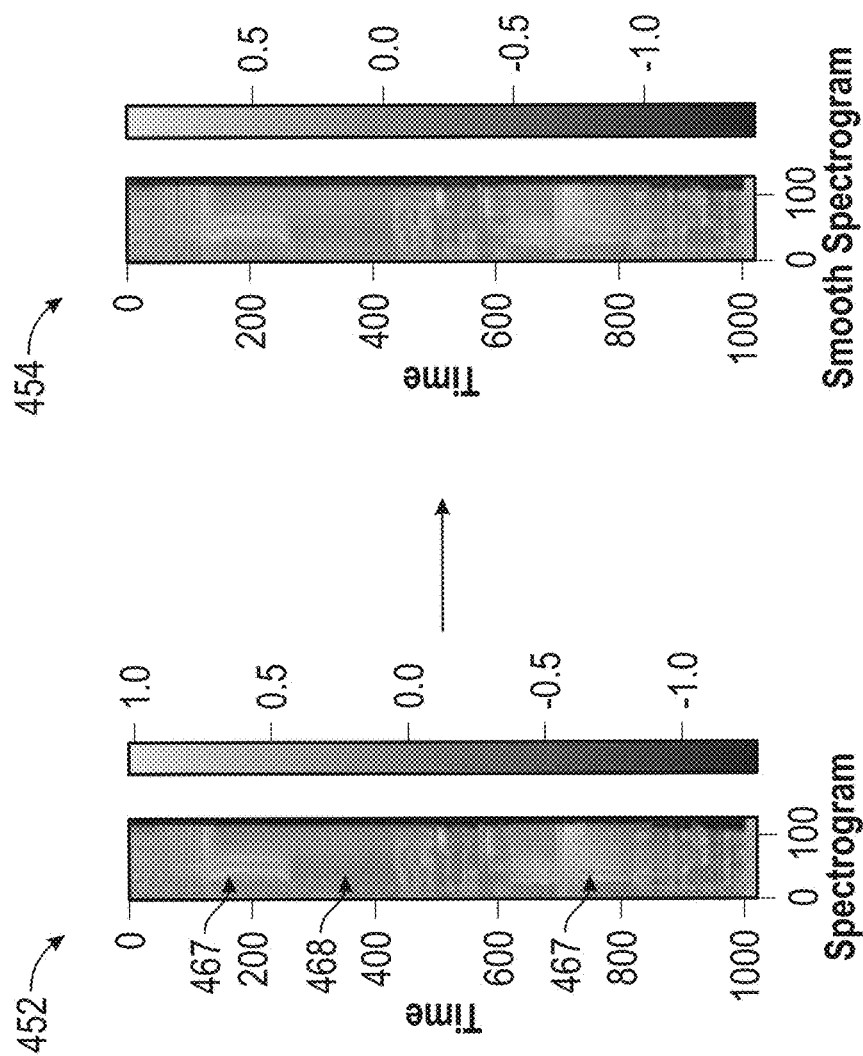
Figure 4D:
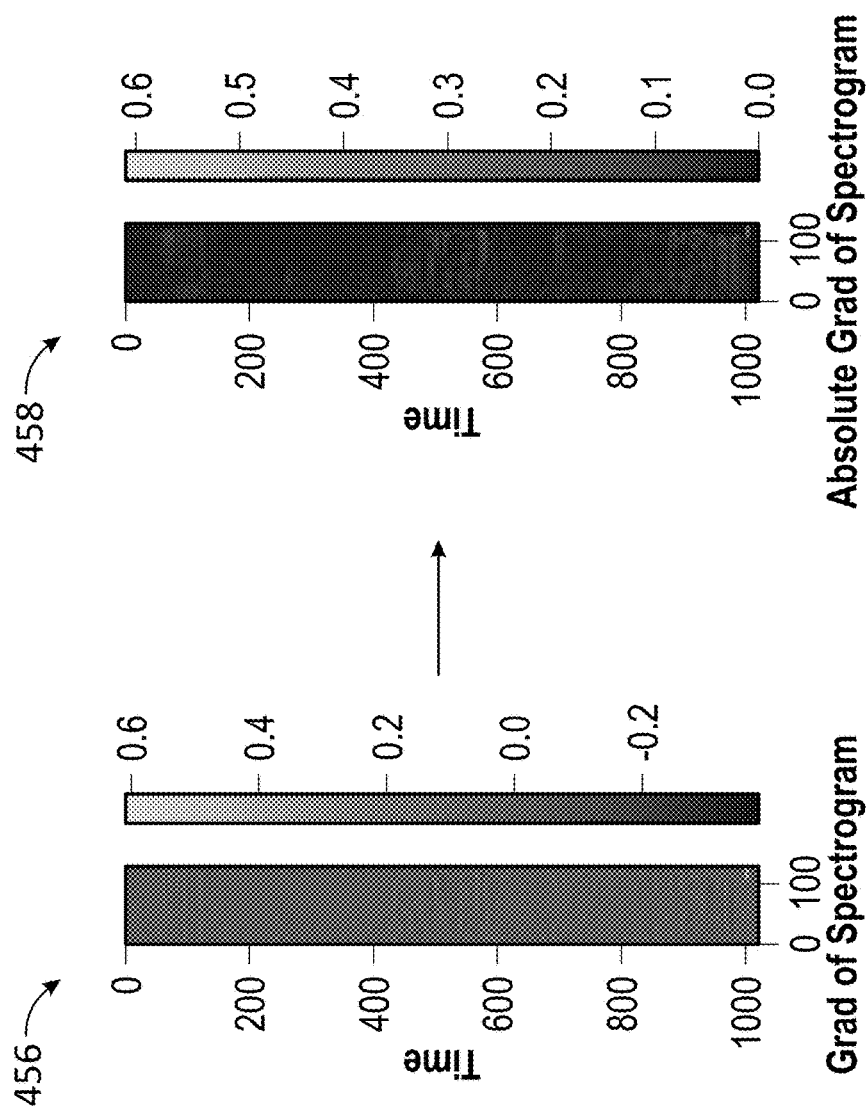
Figure 4E:
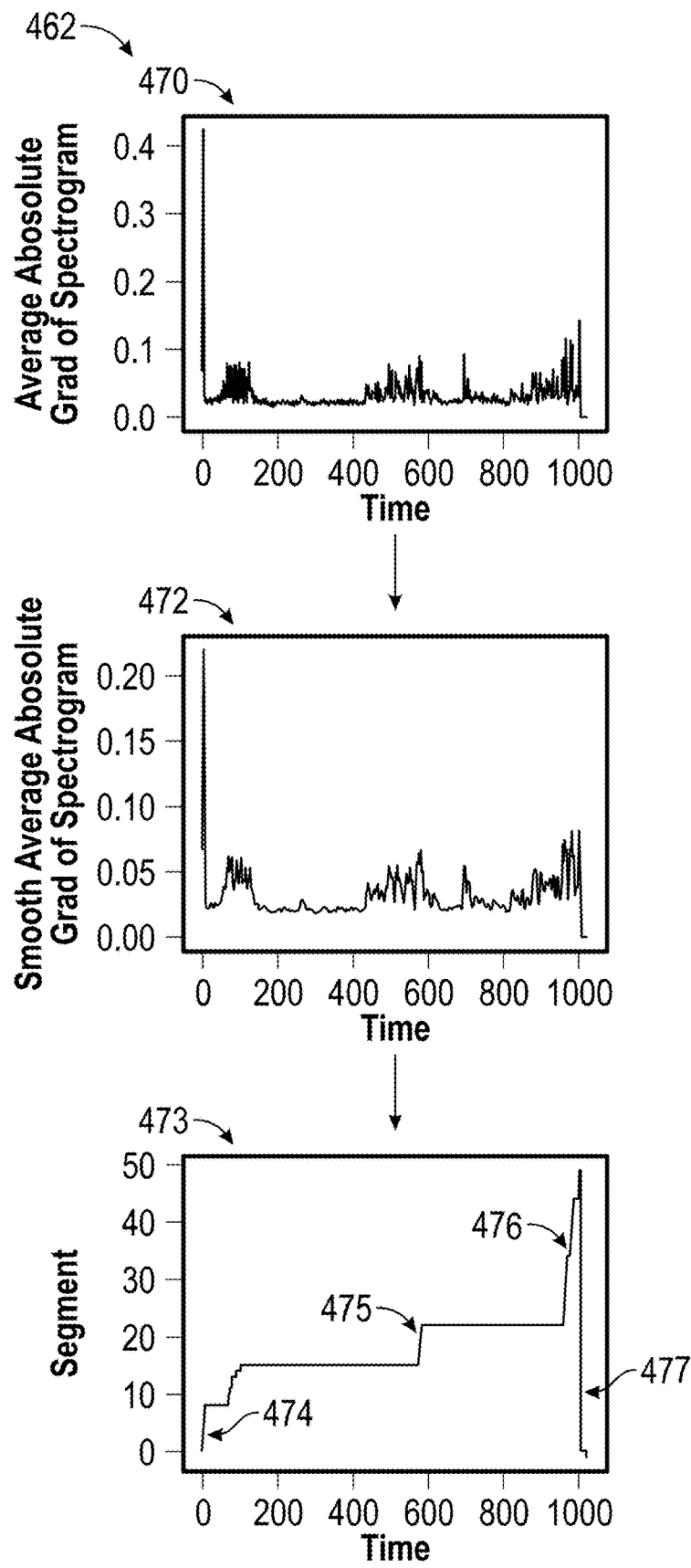

Particularly, the process flow 450 may involve at least the following operations. Operation 452 may involve receiving the audio spectrogram. The audio spectrogram may include audio data that is associated with a particular video segment that is being processed. Operation 454 may involve smoothing the audio spectrogram data. As one non-limiting example, a second order smooth function may be applied to the audio spectrogram along the time dimension. This may be performed to remove noise in the data. Operations 452 and 454 are illustrated in greater detail within FIG. 4C. For example, FIG. 4C shows the audio spectrogram 466. The audio spectrogram 466 may include portions with audio data (for example, portion 467 and portion 468) and portions with no audio data (for example, portion 469).

Operation 456 may involve determining a gradient of the smoothed audio spectrogram data along the time dimension. The gradient may be determined in order to identify portions of the audio spectrogram data in which there is a significant enough difference in amplitude between two points in time on the spectrogram to indicate a change in audio activity. Operation 458 may involve determining the absolute value of the gradient of the spectrogram determined in operation 456. The absolute value may be taken because there may be negative changes in audio activity resulting from the gradient. For example, if audio activity transitions from high to low, then there may be a negative gradient. The absolute value ensures that all transitions are treated as positive values for more effective processing of the data. Operations 456 and 458 are illustrated in greater detail within FIG. 4D.

Operation 462 may involve determining segment transition points in the audio data. Operation 462 is illustrated in greater detail within FIG. 4E. For example, operation 462 may comprise operations 470, 472, and 473. Operation 470 may involve averaging the absolute gradient along the feature dimension to obtain the change along the time domain. For example, plot 470 shows the average absolute gradient of the spectrogram on the y-axis of the plot and time on the x-axis of the plot. To obtain nontrivial audio segments, operation 472 may also involve may involve smoothing the average absolute gradient. Further, operation 473 may also involve identifying segment transition points. For example, transitions points may include at least transition point 474, transition point 475, transition point 476, and/or transition point 477.

Figure 4F:
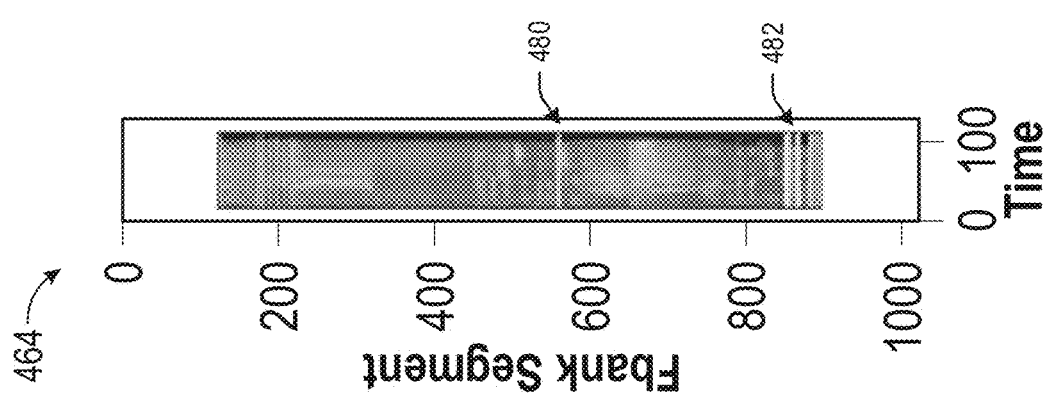

Finally, operation 464 may involve performing the masking of different portions of the audio data based on the prior operations. For example, FIG. 4F illustrates masked portion 480 and masked portion 482.

One or more operations of the methods, process flows, or use cases of FIGS. 1-4 may have been described above as being performed by a user device, or more specifically, by one or more program module(s), applications, or the like executing on a device. It should be appreciated, however, that any of the operations of the methods, process flows, or use cases of FIGS. 1-4 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 5:
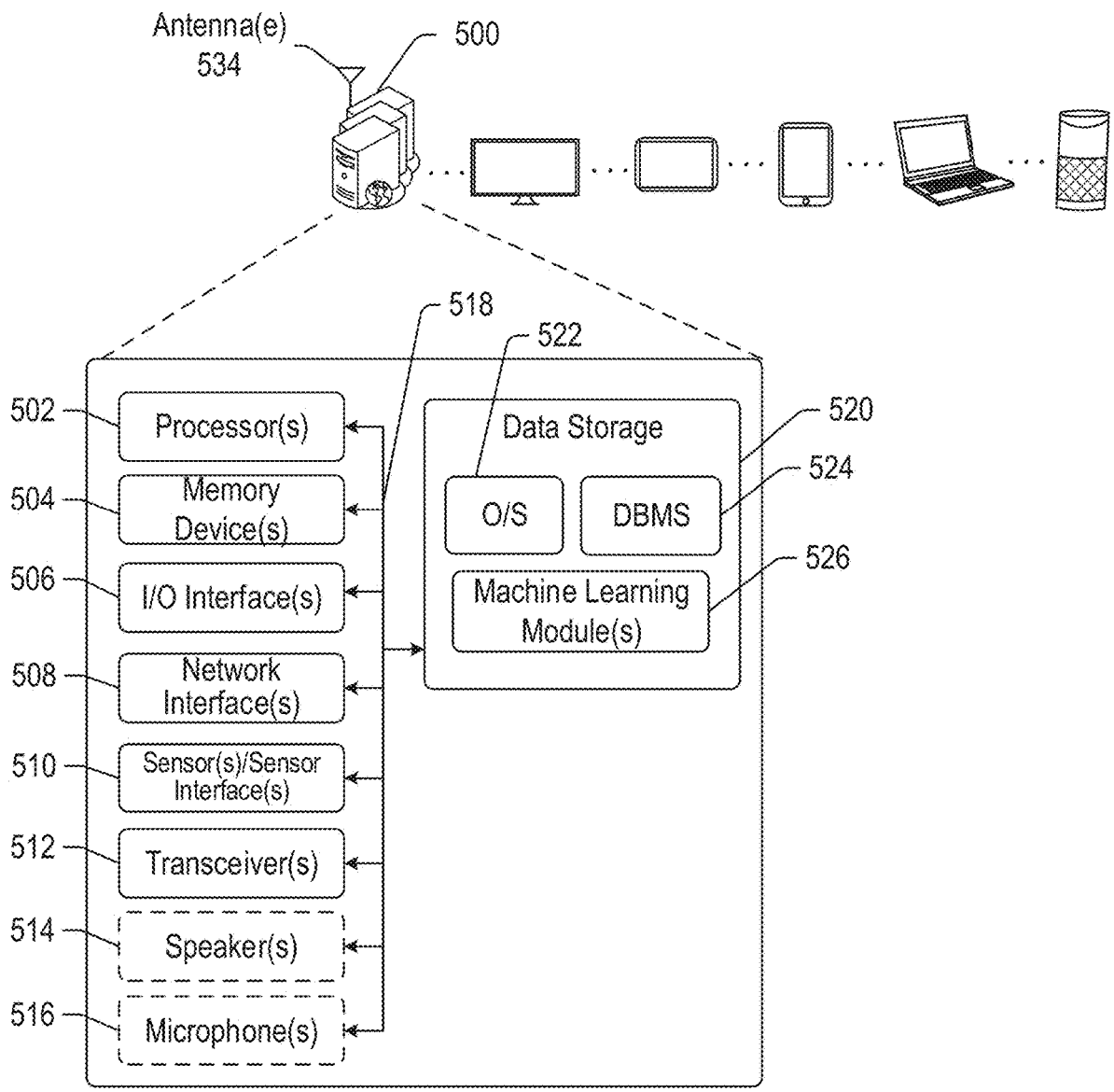
FIG. 5 is a schematic block diagram of an illustrative device in accordance with one or more example embodiments of the disclosure.

FIG. 5 is a schematic block diagram of an illustrative remote server 500 in accordance with one or more example embodiments of the disclosure. The remote server 500 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 500 may correspond to an illustrative device configuration for the devices of FIGS. 1-4.

The remote server 500 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 500 may include one or more processors (processor(s)) 502, one or more memory devices 504 (generically referred to herein as memory 504), one or more input/output (I/O) interface(s) 506, one or more network interface(s) 508, one or more sensors or sensor interface(s) 510, one or more transceivers 512, one or more optional speakers 514, one or more optional microphones 516, and data storage 520. The remote server 500 may further include one or more buses 518 that functionally couple various components of the remote server 500. The remote server 500 may further include one or more antenna (e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the remote server 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server 500 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 504 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 520 may include removable storage and/or nonremovable storage including, but not limited to, magnetic storage, optical disk storage, and/or tape storage.

The data storage 520 may provide nonvolatile storage of computer-executable instructions and other data. The memory 504 and the data storage 520, removable and/or nonremovable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 520 for nonvolatile storage.

More specifically, the data storage 520 may store one or more operating systems (O/S) 522; one or more database management systems (DBMS) 524; and one or more program module(s), applications, engines, computer-executable code, scripts, or the like such as, for example, one or more machine learning module(s) 526. Some or all of these module(s) may be sub-module(s). Any of the components depicted as being stored in data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 520 may support functionality described in reference to correspondingly named components earlier in this disclosure.

The data storage 520 may further store various types of data utilized by components of the remote server 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, the datastore(s) may include, for example, purchase history information, user action information, user profile information, a database linking search queries and user actions, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the machine learning module(s) 526 may include computer-executable instructions, code, or the like that responsive to execution by one or more of the processor(s) 502 may perform functions including, but not limited to, performing any functionality associated with the AVT as described herein, and the like.

Referring now to other illustrative components depicted as being stored in the data storage 520, the O/S 522 may be loaded from the data storage 520 into the memory 504 and may provide an interface between other application software executing on the remote server 500 and hardware resources of the remote server 500. More specifically, the O/S 522 may include a set of computer-executable instructions for managing hardware resources of the remote server 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 500 is a mobile device, the DBMS 524 may be any suitable light-weight DBMS optimized for performance on a mobile device.

Referring now to other illustrative components of the remote server 500, the input/output (I/O) interface(s) 506 may facilitate the receipt of input information by the remote server 500 from one or more I/O devices as well as the output of information from the remote server 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna (e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 500 may further include one or more network interface(s) 508 via which the remote server 500 may communicate with any of a variety of other systems, platforms, networks, devices, and so forth. The network interface(s) 508 may enable communication, for example, with one or more wireless routers, one or more host servers, one or more web servers, and the like via one or more of networks.

The antenna (e) 534 may include any suitable type of antenna depending, for example, on the communications protocols used to transmit or receive signals via the antenna (e) 534. Non-limiting examples of suitable antennas may include directional antennas, nondirectional antennas, dipole antennas, folded dipole antennas, patch antennas, multiple-input multiple-output (MIMO) antennas, or the like. The antenna (e) 534 may be communicatively coupled to one or more transceivers 512 or radio components to which or from which signals may be transmitted or received.

As previously described, the antenna (e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna (e) 534 may be configured to transmit or receive radio frequency signals within any suitable frequency range forming part of the unlicensed portion of the radio spectrum.

The antenna (e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna (e) 534—transmitting or receiving radio frequency (RF) signals in the bandwidth and/or channels corresponding to the communications protocols utilized by the remote server 500 to communicate with other devices. The transceiver(s) 512 may include hardware, software, and/or firmware for modulating, transmitting, or receiving—potentially in cooperation with any of antenna (e) 534—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 514 may be any device configured to generate audible sound. The optional microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionalities described as being supported by any of the program module(s) depicted in FIG. 5 may be implemented, at least partially, in hardware and/or firmware across any number of devices.

It should further be appreciated that the remote server 500 may include alternate and/or additional hardware, software, or firmware components beyond those described or depicted without departing from the scope of the disclosure. More particularly, it should be appreciated that software, firmware, or hardware components depicted as forming part of the remote server 500 are merely illustrative and that some components may not be present, or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether That which is claimed is:

1. A method comprising:
receiving, by a video encoder of an audio-video transformer neural network comprising one or more computer processors coupled to memory, a first frame and a second frame associated with a first segment of a video;
receiving, by an audio encoder of the audio-video transformer neural network, an audio spectrogram comprising first audio data associated with the first segment of the video;
generating, by the video encoder, a first video embedding, the first video embedding including a first video token and a second video token, the first video token including a first portion of pixels included in the first frame, and the second video token including a first classification token;
generating, by the audio encoder, a first audio embedding, the first audio embedding including a first audio token and a second audio token, the first audio token including a first portion of the first audio data included in the audio spectrogram, and the second audio token including a second classification token;
receiving, by a first loss function, the first video embedding;
receiving, by a second loss function, the first video embedding and the first audio embedding;
generating, by a multimodal bottleneck transformer of the audio-video transformer, a multimodal bottleneck token used for cross-modality fusion of the first video embedding and the first audio embedding;
combining the multimodal bottleneck token with the first video embedding and the first audio embedding to perform multimodal fusion of the first video embedding and the first audio embedding;
determining an output including the first video embedding and the first audio embedding;
receiving, by a third loss function and a fourth loss function, the output; and
determining a classification of the first portion of the video based on the output.

2. The method of claim 1, further comprising:
training the audio-video transformer neural network based on one or more outputs of the first loss function, the second loss function, the third loss function, and the fourth loss function, wherein the first loss function determines an alignment of the first frame, second frame, and first audio data,
wherein the second loss function determines an accuracy of the classification of the first portion of the video based on the first classification token,
wherein the third loss function determines an accuracy of the classification of the first portion of the video based on the first classification token and the second classification token, and
wherein the fourth loss function determines a difference between the first classification token and the second classification token.

3. The method of claim 1, further comprising:
training the audio-video transformer neural network by masking a first portion of the first audio data, wherein masking the first portion of the audio spectrogram comprises:

determining second audio data, the second audio data comprising a smoothed version of the first audio data to remove noise from the first audio data;
determining third audio data, the third audio data comprising a gradient of the second audio data;
determining fourth audio data, the fourth audio data comprising an absolute value of the third audio data;
determining fifth audio data, the fifth audio data comprising an average of the fourth audio data; and
determining a segment transition based on the fifth audio data.

4. The method of claim 1, further comprising:
performing, based on the classification of the first portion of the video, an action comprising at least one of: video indexing, video search, video retrieval, action localization, action clustering, or video clustering.

5. A method comprising:
receiving, by a video encoder of an audio-video transformer neural network comprising one or more computer processors coupled to memory, a first frame and a second frame associated with a first segment of a video;
receiving, by an audio encoder of the audio-video transformer neural network, an audio spectrogram comprising first audio data associated with the first segment of the video;
generating, by the video encoder, a first video embedding;
generating, by the audio encoder, a first audio embedding;
determining a fusion of the first video embedding and the first audio embedding using a multimodal bottleneck token;
determining an output including the first video embedding and the first audio embedding;
determining a classification of the first segment of the video based on the output;
receiving, by a plurality of loss functions, the first video embedding;
receiving, by the plurality of loss functions, the first video embedding and the first audio embedding;
receiving, by the plurality of loss functions, the output; and
training the audio-video transformer neural network based on one or more outputs of the one or more loss functions.

6. The method of claim 5, wherein the plurality of loss functions comprise a first loss function, second loss function, third loss function, and fourth loss function.

7. The method of claim 6, further comprising:
determining, using the first loss function, an alignment of the first frame, second frame, and first audio data.

8. The method of claim 6, further comprising:
comparing, using the second loss function and based on a first classification token, a first classification probability and a known classification associated with the first segment of the video.

9. The method of claim 6, further comprising:
comparing, using the third loss function, a first classification probability based on a first classification token and a second classification probability based on a second classification token.

10. The method of claim 6, further comprising:
determining, using the fourth loss function, a difference between a first classification token and a second classification token.

11. The method of claim 5, further comprising training the audio-video transformer neural network by masking a first portion of the first audio data, wherein masking the first portion of the audio spectrogram comprises:
  determining second audio data, the second audio data comprising a smoothed version of the first audio data to remove noise from the first audio data;
  determining third audio data, the third audio data comprising a gradient of the second audio data;
  determining fourth audio data, the fourth audio data comprising an absolute value of the third audio data;
  determining fifth audio data, the fifth audio data comprising an average of the fourth audio data; and
  determining a segment transition based on the fifth audio data.

12. The method of claim 5, further comprising:
  performing, based on the classification of the first segment of the video, an action comprising at least one of: video indexing, video search, video retrieval, action localization, action clustering, or video clustering.

13. A system comprising:
  at least one memory that stores computer-executable instructions; and
  at least one processor configured to access the memory and execute the computer-executable instructions to:
  receive, by a video encoder of an audio-video transformer neural network comprising one or more computer processors coupled to memory, a first frame and a second frame associated with a first segment of a video;
  receive, by an audio encoder of the audio-video transformer neural network, an audio spectrogram comprising first audio data associated with the first segment of the video;
  generate a mask of a first portion of the first audio data, wherein the mask is non-random and includes a portion of the first portion of the first audio data indicative of a change in audio activity;
  train the audio-video transformer neural network using the mask;
  generate, by the video encoder, a first video embedding, the first video embedding including a first video token and a second video token, the first video token including a first portion of pixels included in the first frame, and the second video token including a first classification token;
  generate, by the audio encoder, a first audio embedding, the first audio embedding including a first audio token and a second audio token, the first audio token including the first portion of the first audio data included in the audio spectrogram, and the second audio token including a second classification token;
  combine a multimodal bottleneck token associated with a second transformer with the first video embedding and the first audio embedding;
  determine an output including the first video embedding and the first audio embedding; and
  determine a classification of the first portion of the video based on the output.

14. The system of claim 13, wherein the at least one processor is further configured to access the memory and execute the computer-executable instructions to:
  receive, by a first loss function, the first video embedding;
  receive, by a second loss function, the first video embedding and the first audio embedding;
  receive, by a third loss function and a fourth loss function, the output; and
  train the audio-video transformer neural network based on one or more outputs of the first loss function, the second loss function, the third loss function, and the fourth loss function.

15. The system of claim 14, wherein the at least one processor is further configured to access the memory and execute the computer-executable instructions to:
  determine, using the first loss function, an alignment of the first frame, second frame, and first audio data.

16. The system of claim 14, wherein the at least one processor is further configured to access the memory and execute the computer-executable instructions to:
  compare, using the second loss function and based on a first classification token, a first classification probability and a known classification associated with the first segment of the video.

17. The system of claim 14, wherein the at least one processor is further configured to access the memory and execute the computer-executable instructions to:
  compare, using the third loss function, a first classification probability based on a first classification token and a second classification probability based on a second classification token.

18. The system of claim 14, wherein the at least one processor is further configured to access the memory and execute the computer-executable instructions to:
  determine, using the fourth loss function, a difference between the first classification token and the second classification token.

19. The system of claim 13, wherein masking the first portion of the audio spectrogram comprises:
  determine second audio data, the second audio data comprising a smoothed version of the first audio data to remove noise from the first audio data;
  determine third audio data, the third audio data comprising a gradient of the second audio data;
  determine fourth audio data, the fourth audio data comprising an absolute value of the third audio data;
  determine fifth audio data, the fifth audio data comprising an average of the fourth audio data; and
  determine a segment transition based on the fifth audio data.

20. The system of claim 13, wherein the at least one processor is further configured to access the memory and execute the computer-executable instructions to:
  perform, based on the classification of the first portion of the video, an action comprising at least one of: video indexing, video search, video retrieval, action localization, action clustering, or video clustering.

* * * * *

UNITED STATES PATENT AND TRADEMARK OFFICE
CERTIFICATE OF CORRECTION

| | | |
|---|---|---|
| PATENT NO. | : 12,367,240 B1 | Page 1 of 1 |
| APPLICATION NO. | : 17/852945 | |
| DATED | : July 22, 2025 | |
| INVENTOR(S) | : Wentao Zhu et al. | |

It is certified that error appears in the above-identified patent and that said Letters Patent is hereby corrected as shown below:

In the Specification

Column 10, Line 8 should read:
-- 306, and audio encoder 308 may be used to extract video embeddings 310, --.

Signed and Sealed this
Second Day of September, 2025

Coke Morgan Stewart
*Acting Director of the United States Patent and Trademark Office*